(12) United States Patent
Masuda et al.

(10) Patent No.: US 6,624,982 B2
(45) Date of Patent: Sep. 23, 2003

(54) MAGNETIC DISK RECORDING APPARATUS

(75) Inventors: Hiromitsu Masuda, Chiyoda (JP); Toshihiko Shimizu, Yasato (JP); Mikio Tokuyama, Tsukuba (JP); Masahito Kobayashi, Ushiku (JP); Masaki Odai, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 375 days.

(21) Appl. No.: 09/791,715

(22) Filed: Feb. 26, 2001

(65) Prior Publication Data

US 2001/0024340 A1 Sep. 27, 2001

(30) Foreign Application Priority Data

Mar. 24, 2000 (JP) .................................... 2000-088504

(51) Int. Cl.⁷ .......................... G11B 21/24; G11B 5/596
(52) U.S. Cl. ............................... 360/294.4; 360/294.6; 360/78.12
(58) Field of Search .......................... 360/75, 77.02, 360/78.04, 78.05, 78.12, 264.1, 264.3, 264.5, 294.1, 294.3, 294.4, 294.6

(56) References Cited

U.S. PATENT DOCUMENTS 6,268,983 B1 * 7/2001 Imada et al. ............. 360/294.3
6,456,464 B1 * 9/2002 Khan et al. .............. 360/294.6
6,487,055 B1 * 11/2002 Mei ......................... 360/294.4
6,515,834 B1 * 2/2003 Murphy ................... 360/294.4

FOREIGN PATENT DOCUMENTS

JP 11-16311 * 1/1999

* cited by examiner

Primary Examiner—Andrew L. Sniezek
(74) Attorney, Agent, or Firm—Antonelli, Terry, Stout & Kraus, LLP

(57) ABSTRACT

In a magnetic recording apparatus including a support arm movable with respect to a magnetic recording disk, a first actuator for moving the support arm with respect to the magnetic recording disk, a pair of support members at least one of which holds a magnetic head thereon and each of which is connected to the first actuator through the support arm to be driven by the first actuator through the support arm, and a pair of second actuators for moving respectively the support members with respect to the support arm so that the support members are respectively moved with respect to the magnetic recording disk by the first actuator and the second actuators, the second actuators move simultaneously the support members respectively with respect to the support arm in respective directions opposite to each other.

25 Claims, 5 Drawing Sheets

MAGNETIC DISK RECORDING APPARATUS

BACKGROUND OF THE INVENTION AND RELATED ART STATEMENT

The present invention relates to a magnetic disk recording apparatus for performing at least one of recording signals onto at least one magnetic recording disk and reading out the signals from the magnetic recording disk.

In a prior-art magnetic disk recording apparatus as disclosed by JP-A-11-16311, a first actuator moves a support arm with respect to a magnetic recording disk, a support member holding thereon a magnetic head is connected to the first actuator through the support arm to be driven by the first actuator through the support arm, a second actuator moves the support member with respect to the support arm so that the support member is moved with respect to the magnetic recording disk by the first actuator and the second actuator, the first actuator moves the support member through the support arm by a relatively large length with respect to the magnetic recording disk, and the second actuator moves the support member by a relatively small length with respect to the magnetic recording disk.

OBJECT AND SUMMARY OF THE INVENTION

An object of the present invention is to provide a magnetic disk recording apparatus for performing at least one of recording signals onto at least one magnetic recording disk and reading out the signals from the magnetic recording disk, in which apparatus a magnetic head is correctly positioned without an undesirable vibration thereof.

According to the invention, in a magnetic recording apparatus for performing at least one of recording signals onto at least one magnetic recording disk and reading out the signals from the magnetic recording disk, comprising, a support arm movable with respect to the magnetic recording disk, a first actuator for moving the support arm with respect to the magnetic recording disk, at least one magnetic head for performing through the magnetic head the at least one of recording the signals onto the magnetic recording disk and reading out the signals from the magnetic recording disk, a pair of support members at least one of which holds the magnetic head thereon and each of which is connected to the first actuator through the support arm to be driven by the first actuator through the support arm, and a pair of second actuators for moving respectively the support members with respect to the support arm so that the support members are respectively moved with respect to the magnetic recording disk by the first actuator and the second actuators, the second actuators move simultaneously the support members respectively with respect to the support arm in respective directions opposite to each other.

Since the second actuators move simultaneously the support members respectively with respect to the support arm in respective directions opposite to each other, a force (for example, rotational moment) moving one of the support members cancels a force moving another one of the support members so that a vibration caused by moving simultaneously the support members respectively with respect to the support arm is not generated to keep an accuracy in positioning the magnetic head.

The magnetic disk recording apparatus may comprise a pair of the magnetic heads while each of the support members holds the magnetic head thereon as a combination of the magnetic head and the support member. When the support members with the respective magnetic heads thereon are respectively swingable with respect to the support arm, it is preferable that a moment of inertia of one of the combinations around the support arm is substantially equal to that of another of the combinations around the support arm to effectively cancel the forces. When the support arm is swingable on an rotational axis of the first actuator, it is preferable that a moment of inertia of one of the combinations around the rotational axis is substantially equal to that of another of the combinations around the rotational axis to effectively cancel the forces.

Alternatively, one of the support members may be prevented from holding the magnetic head thereon, and hold a counter weight. When the support member with the magnetic head thereon and the support member with the counter weight thereon are respectively swingable with respect to the support arm, it is preferable that a moment of inertia of a combination of the support member and the magnetic head around the support arm is substantially equal to that of a combination of the support member and the counter weight around the support arm to effectively cancel the forces. When the support arm is swingable on an rotational axis of the first actuator, it is preferable that a moment of inertia of a combination of the support member and the magnetic head on the rotational axis is substantially equal to that of a combination of the support member and the counter weight on the rotational axis to effectively cancel the forces.

It is preferable that the second actuators move simultaneously the support members respectively with respect to the support arm in the respective directions opposite to each other by respective distances, speeds and/or forces (accelerations or decelerations) substantially equal to each other.

It is preferable for keeping correctly a relationship in position and/or attitude between the support arm and each of the support members that at least a part of the support arm and at least a part of each of the support members are monolithically formed, and a flexible area is arranged between the at least a part of the support arm and the at least a part of each of the support members.

When the second actuators are expandable and contractible to move respectively the support members with respect to the support arm, the second actuators are energized in such a manner that one of the second actuators expands to move one of the support members in a first direction while another one of the second actuators contracts to move another one of the support members in a second direction, the first and second directions being opposite to each other. It is preferable for keeping correctly a relationship in position and/or attitude between the support members that the second actuators are arranged in such a manner that directions parallel to a magnetic recording disk thickness direction in which directions the support members are simultaneously bent at least partially respectively by the expandable and contractible second actuators with respect to the support arm are identical to each other when the second actuators are energized to move respectively the support members with respect to the support arm. Areas of the support members onto which the second actuators are fixed respectively may face to each other in the magnetic recording disk thickness direction. It is preferable that a flexible member connecting the support arm to each of the support members is juxtaposed with each of the second actuators in the magnetic recording disk thickness direction so that the support members are bent at least partially with respect to the support arm respectively in the directions parallel to the magnetic recording disk thickness direction by the second actuators.

The second actuators may be piezoids. When one of the second actuators has a first pair of expandable and contractible actuators to swing one of the support members around the support arm, and another one of the second actuators has a second pair of expandable and contractible actuators to swing another one of the support members around the support arm, it is preferable that the second actuators are energized in such a manner that one of the expandable and contractible actuators of the first pair expands while another one of the expandable and contractible actuators of the first pair contracts so that the one of the support members is swung in a first circumferential direction around the support arm, and one of the expandable and contractible actuators of the second pair expands while another one of the expandable and contractible actuators of the second pair contracts so that the another one of the support members is swung in a second circumferential direction around the support arm, the first and second circumferential directions being opposite to each other. It is preferable for keeping correctly the relationship in position and/or attitude between the support members that the expandable and contractible actuators are arranged in such a manner that directions in which the support members are simultaneously twisted respectively by the first pair of the expandable and contractible actuators and the second pair of the expandable and contractible actuators with respect to the support arm are identical to each other when the second actuators are energized to swing respectively the support members with respect to the support arm. It is preferable that a flexible member connecting the support arm to each of the support members is juxtaposed with each of the second actuators in the magnetic recording disk thickness direction so that the support members are twisted respectively with respect to the support arm by the expandable and contractible actuators.

It is preferable that a polar direction of the piezoid of one of the second actuators is directed away from one of the support members moved by the one of the second actuators while a polar direction of the piezoid of another one of the second actuators is directed toward another one of the support members moved by the another one of the second actuators so that the one of the second actuators expands while another one of the second actuators contracts when the second actuators are energized.

When the piezoid of each of the second actuators has a pair of first electrode adjacent to the support members in the magnetic recording disk thickness direction and second electrode distant from the support members in the magnetic recording disk thickness direction, it is preferable for easily energizing the piezoids that electric potentials applied to the second electrodes respectively are equal to each other and/or that the first electrodes are electrically grounded. It is preferable for easily energizing the piezoids that an electric potential difference to be applied to the piezoid of one of the second actuators to be activated is equal to an electric potential difference to be applied to the piezoid of another one of the second actuators to be activated.

It is preferable for effectively canceling the forces that a change in electric potential difference to be applied to the piezoid of one of the second actuators to be activated in accordance with a time proceeding is substantially equal to an electric potential difference to be applied to the piezoid of another one of the second actuators to be activated in accordance with the time proceeding so that the movements of the support members in respective directions opposite to each other are synchronized.

The support members and/or the support arm may be electrically grounded.

DETAILED DESCRIPTION OF PREFERRED EMBODIMENTS

Figure 1:
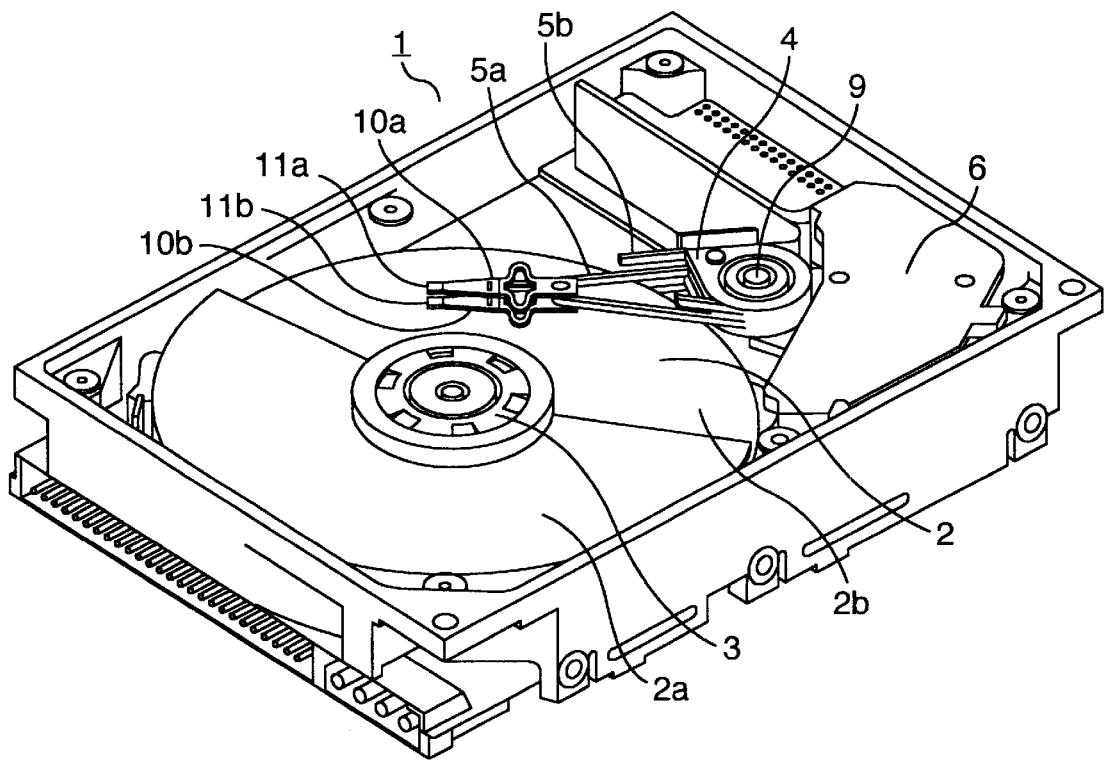
FIG. 1 is a partially cross-sectional view showing a magnetic disk recording apparatus of the invention.
Figure 2:
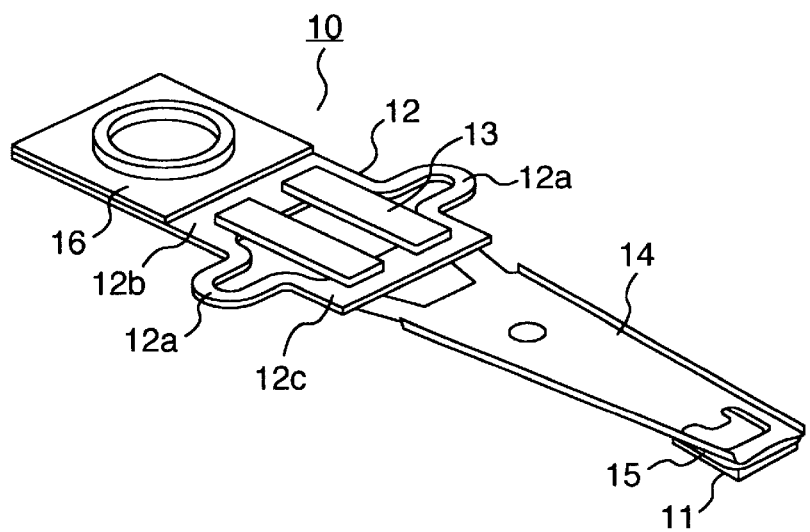
FIG. 2 is an oblique projection view showing a magnetic head support mechanism having a micro-movement actuator, a support member and a magnetic head.

As shown in FIGS. 1 and 2, a magnetic disk recording apparatus 1 has magnetic recording disks 2a and 2b each of which has opposite recording surfaces, a disk rotating motor 3 for rotating the magnetic recording disks 2a and 2b, a voice coil motor 6 as the claimed first actuator for rotating a pivot shaft 9 to move a magnetic head support mechanism radially with respect to the magnetic recording disks 2 by a relatively large length, a carriage 4 fixed to the pivot shaft 9 to be driven by the voice coil motor 6, support arms 5a and 5b extending radially from the carriage 4, and a pair of magnetic head carriers 10a and 10b fixed to each of the support arms 5a and 5b. The pair of magnetic head carriers 10a and 10b may be arranged between the magnetic recording disks 2a and 2b. Each of the magnetic head carriers 10a and 10b has a magnetic head 11a or 11b for performing at least one of magnetizing partially the magnetic recording disk 2 to record signals onto the magnetic recording disk 2 and detecting the magnetism formed on the magnetic recording disk 2 to read out the signals from the magnetic recording disk 2, a load beam 14 for applying an elastic force to the magnetic head 11 to be pressed against the magnetic recording disk 2, a flexure plate 15 arranged between the load beam 14 and the magnetic head 11 for pivotal support of the magnetic head 11 along the recording surface, a mounting member 16 detachably attached to the support arm 5a or 5b, and a monolithically formed connecting member 12 connecting the mounting member 16 to the load beam 14. Each of the connecting members 12 has a first part 12b fixed to the mounting member 16, a second part 12c fixed to the load beam 14 and a pair of curved flexible elements 12a between the first and second parts 12a and 12b. Each of the connecting members 12 is divided by the curved flexible elements 12a to the first and second parts 12b and 12c. The claimed support arm corresponds to a combination of the pivot shaft 9, carriage 4, support arm 5a or 5b, mounting member 16 and first part 12b, and each of the claimed support members corresponds to a combination of the second part 12c, load beam 14 and the flexure plate 15.

A micro-movement actuator 13 as the claimed second actuator is mounted on each of the connecting members 12 to swing slightly the second part 12c with respect to the first part 12b to move the magnetic head support mechanism radially with respect to the magnetic recording disks 2 by a relatively small length. The micro-movement actuator 13 may be piezoid or electromagnetic actuator.

Figure 3:
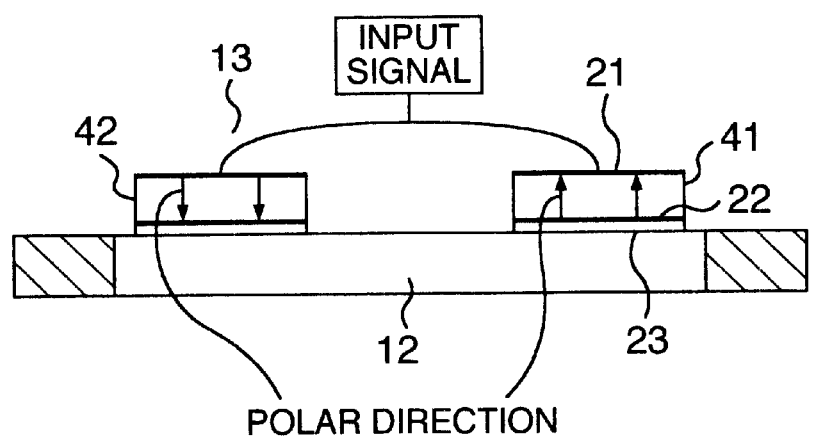
FIG. 3 is a cross sectional view showing the magnetic head support mechanism of FIG. 2.

When the micro-movement actuator 13 is piezoid, as shown in FIG. 3, the micro-movement actuator 13 is formed by a pair of piezoid elements 41 and 42. A ratio between an electric potential difference for energizing and a displacement length thereby in the piezoid element 41 is substantially equal to a ratio between an electric potential difference for energizing and a displacement length thereby in the piezoid element 42. Opposite ends of each of the piezoid elements 41 and 42 distant from each other are connected to the first and second parts 12b and 12c respectively. One of the piezoid elements 41 and 42 contracts when another one of the piezoid elements 41 and 42 expands, and expands when the another one of the piezoid elements 41 and 42 contracts, so that the second part 12c moves around the first part 12b.

Each of the piezoid elements 41 and 42 has an inside electrode 22 adjacent to the connecting members 12 and an outside electrode 21 distant away from the connecting members 12 in a piezoid element thickness direction. In each of the micro-movement actuators 13 or on each of the connecting members 12, polar or polarized directions of the piezoid elements 41 and 42 are opposite to each other, while the inside electrodes 22 of both the piezoid elements 41 and 42 are electrically grounded through an electrically conductive adhesive 23, the connecting members 12, the mounting member 16, the support arm 5a or 5b and so forth, and electric potentials of input signals applied to the outside electrodes 21 of both the piezoid elements 41 and 42 are equal to each other. Therefore, displacement or deformation directions of the piezoid elements 41 and 42 along longitudinal directions thereof are opposite to each other.

Figure 4:
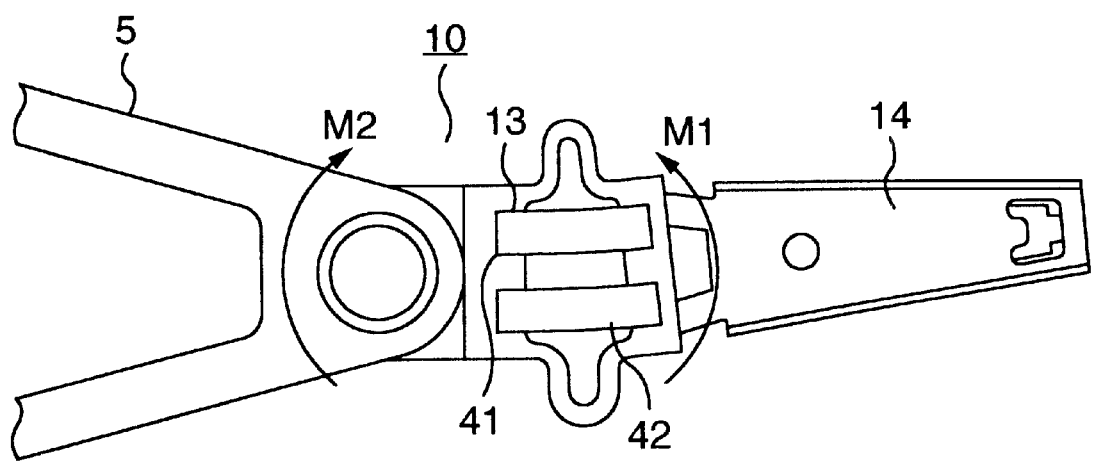
FIG. 4 is a front view showing a torque for a movement of the support member with respect to the support arm and a torque generated by the movement of the support member and applied to the support arm.

As shown in FIG. 4, when the second part 12c is moved around the first part 12b by a moment M1 generated by the contraction and expansion of the piezoid elements 41 and 42 along longitudinal directions thereof to move the magnetic head support mechanism radially with respect to the magnetic recording disks 2, a reaction moment M2 is applied to the mounting member 16, the support arm 5a or 5b and so forth. Since a rigidity of the support arms 5a and 5b cannot be large because of necessity of decreasing a moment of inertia thereof, an accuracy in positioning the magnetic head support mechanism is deteriorated by the reaction moment M2.

Figure 5:
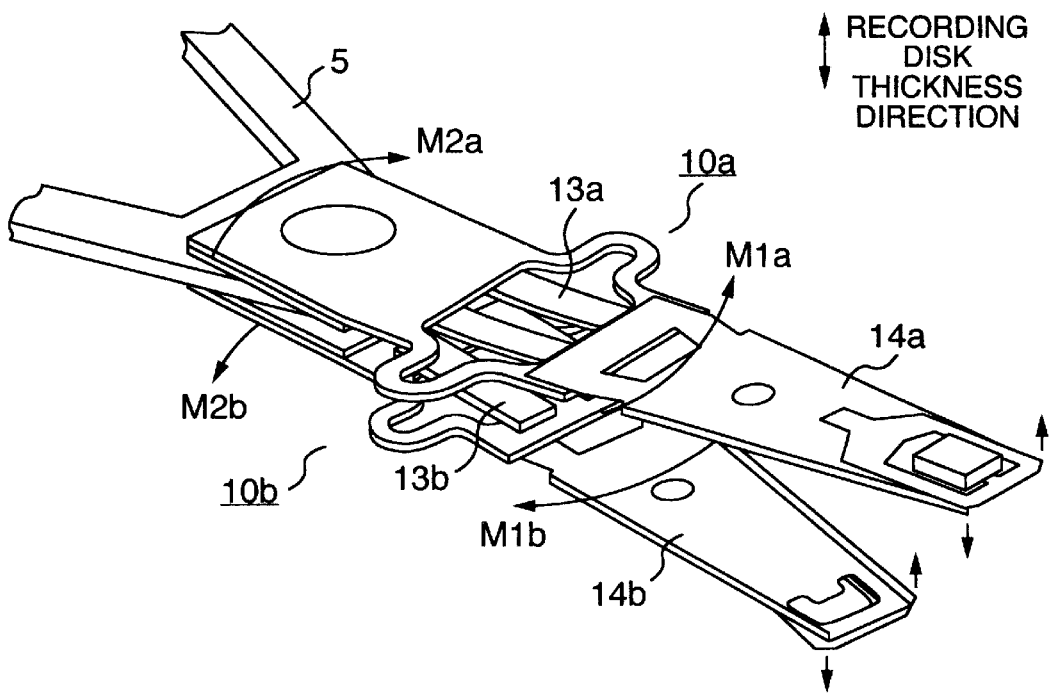
FIG. 5 is an oblique projection view showing a magnetic head support mechanism having a support arm and a pair of support members with respective magnetic heads.

As shown in FIG. 5, according to the invention, directions of the moments M1a and M1b generated respectively on the connecting members 12 for holding respectively thereon the load beams 14a and 14b mounted on each of the support arms 5a and 5b are opposite to each other, so that the reaction moments M2a and M2b cancel each other to prevent the reaction moments M2a and M2b from being applied to each of the support arms 5a and 5b. Therefore, the accuracy in positioning the magnetic head support mechanism along a imaginary plane parallel to the recording surface of the recording disk is not deteriorated by the reaction moment M2.

Figure 6:
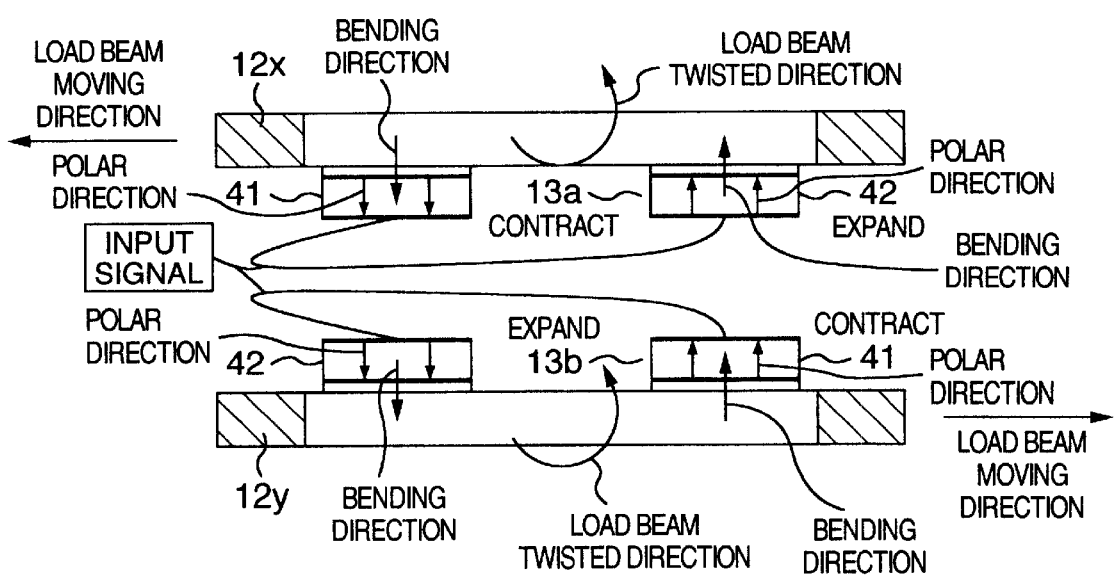
FIG. 6 is a cross sectional view showing the magnetic head support mechanism of FIG. 5.

On the connecting members 12x and 12y mounted on each or one of the support arms 5a and 5b, as shown in FIG. 6, the polar or polarized directions of the piezoid element 41 on one of the connecting members 12x and 12y and the piezoid element 42 on another one of the connecting members 12x and 12y facing to each other are identical to each other, or the polar or polarized direction of the piezoid element 41 on the one of the connecting members 12x and 12y with respect to the grounded electrode is opposite to the polar or polarized direction of the piezoid element 42 on the another one of the connecting members 12x and 12y facing to the piezoid element 41 on the one of the connecting members 12x and 12y with respect to the grounded electrode, while the inside electrodes 22 of all of the piezoid elements 41 and 42 are electrically grounded and the electric potentials of input signals applied to the outside electrodes 21 of all of the piezoid elements 41 and 42 by single input signal drive amplifier are equal to each other. Therefore, on the connecting members 12x and 12y mounted on each or one of the support arms 5a and 5b, the piezoid element 41 on the one of the connecting members 12x and 12y contracts when the piezoid element 42 on the another one of the connecting members 12x and 12y facing to the piezoid element 41 on the one of the connecting members 12x and 12y expands, and the piezoid element 41 on the one of the connecting members 12x and 12y expands when the piezoid element 42 on the another one of the connecting members 12x and 12y facing to the piezoid element 41 on the one of the connecting members 12x and 12y contracts, so that a bending direction by the piezoid element 41 on the one of the connecting members 12x and 12y mounted on the one of the support arms 5a and 5b is identical to a bending direction of the piezoid element 42 on the another one of the connecting members 12x and 12y facing to the piezoid element 41 on the one of the connecting members 12x and 12y mounted on the one of the support arms 5a and 5b, and a twisted direction by the piezoid elements 41 and 42 on the one of the connecting members 12x and 12y mounted on the one of the support arms 5a and 5b is identical to a twisted direction of the piezoid elements 41 and 42 on the another one of the connecting members 12x and 12y facing to the piezoid element 41 on the one of the connecting members 12x and 12y mounted on the one of the support arms 5a and 5b.

Figure 7:
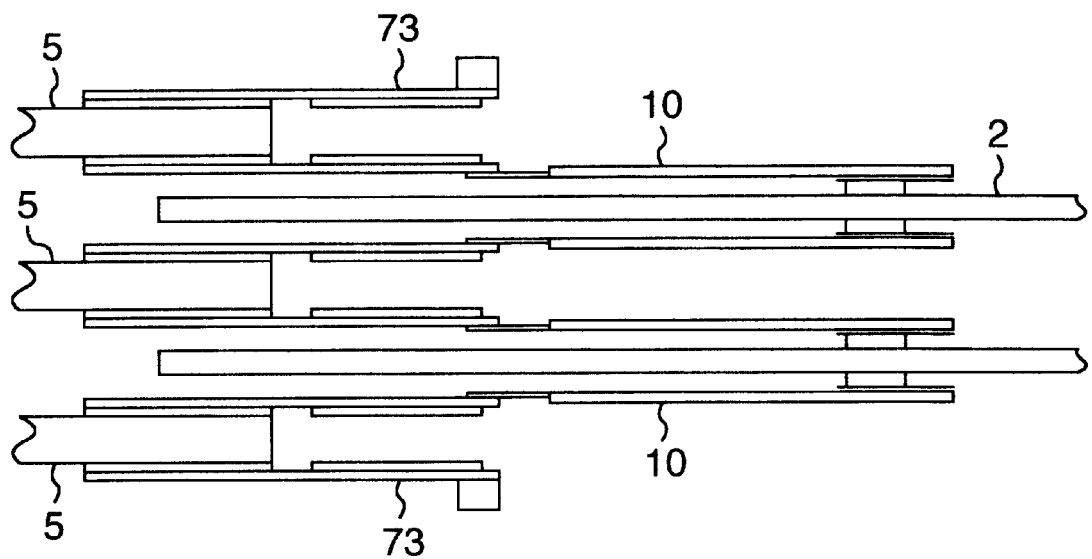
FIG. 7 is a side view showing another magnetic head support mechanism having a support arm and a pair of support members one of which holds thereon a magnetic head and another one of which holds thereon a counter weight.
Figure 8:
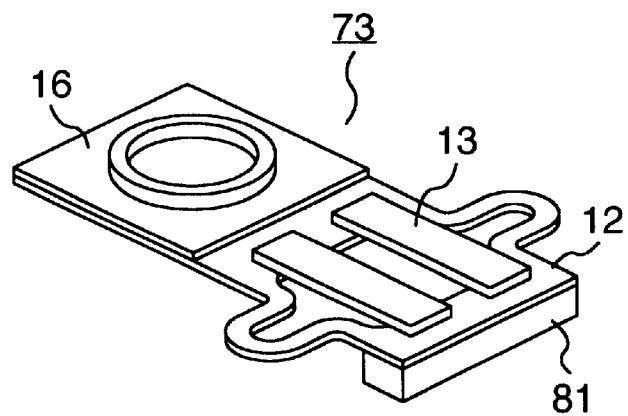
FIG. 8 is an oblique projection view showing the support member holding thereon the counter weight.

As shown in FIGS. 7 and 8, on one of the connecting members 12x and 12y mounted on one of the support arms 5a and 5b, a combination of the load beam 14, magnetic head 11 and flexure plate 15 may be replaced by a counter weight 81 mounted on the second part 12c of the one of the connecting members 12x and 12y. The moment of inertia of the combination of the load beam 14, magnetic head 11 and flexure plate 15 around the first part 12b is substantially equal to the moment of inertia of the counter weight 81 around the first part 12b.

Figure 9:
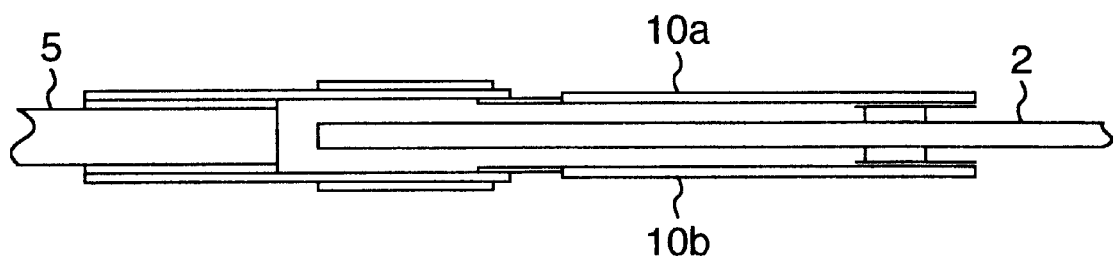
FIG. 9 is a side view showing another magnetic head support mechanism having a support arm and a pair of support members with respective magnetic heads.

As shown in FIG. 9, the recording disk 2 may be arranged between the magnetic head carriers 10a and 10b of the pair fixed to the support arm 5.

Figure 10:
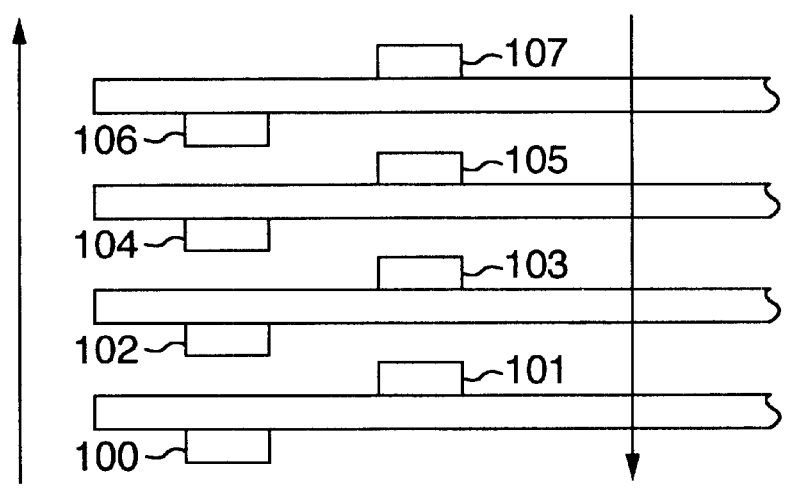
FIG. 10 is a schematic view showing an order in which the magnetic heads are changed to perform recording signals onto magnetic recording disks or reading out the signals from the magnetic recording disks.

When magnetic heads 100, 102, 104 and 106 are simultaneously moved by the micro-movement actuator 13 in a first common direction while magnetic heads 101, 103, 105 and 107 are simultaneously moved by the micro-movement actuator 13 in a second common direction opposite to the first common direction so that a rotational moment for swinging the magnetic heads 100, 102, 104 and 106 in the first common direction cancels a rotational moment for swinging the magnetic heads 101, 103, 105 and 107, as shown in FIG. 10, on recording the signals or reading out the signals, a set of the magnetic heads 100, 102, 104 and 106 is used while an activated magnetic head is changed in order (denoted by an arrow in FIG. 10) among the magnetic heads 100, 102, 104 and 106, and thereafter a set of the magnetic heads 101, 103, 105 and 107 is used while the activated magnetic head is changed in order (denoted by an arrow in FIG. 10) among the magnetic heads 101, 103, 105 and 107. Therefore, it is not necessary for a displacement between the set of the magnetic heads 100, 102, 104 and 106 and the set of the magnetic heads 101, 103, 105 and 107 caused by the micro-movement actuator 13 to be compensated to correctly position the activated magnetic head when the activated magnetic head is changed in order among the magnetic heads 101, 103, 105 and 107 or the magnetic heads 100, 102, 104 and 106, and the displacement between the set of the magnetic heads 100, 102, 104 and 106 and the set of the magnetic heads 101, 103, 105 and 107 caused by the micro-movement actuator 13 is compensated to correctly position the activated magnetic head when the activated magnetic head is changed between the set of the magnetic heads 100, 102, 104 and 106 and the set of the magnetic heads 101, 103, 105 and 107. Therefore, the activated magnetic can be changed speedily.

What is claimed is:

1. A magnetic recording apparatus for performing at least one of recording signals onto at least one magnetic recording disk and reading out the signals from the magnetic recording disk, comprising,
    a support arm movable with respect to the magnetic recording disk,
    a first actuator for moving the support arm with respect to the magnetic recording disk,
    at least one magnetic head for performing through the magnetic head the at least one of recording the signals onto the magnetic recording disk and reading out the signals from the magnetic recording disk,
    a pair of support members at least one of which holds the magnetic head thereon and each of which is connected to the first actuator through the support arm to be driven by the first actuator through the support arm, and
    a pair of second actuators for moving respectively the support members with respect to the support arm so that the support members are respectively moved with respect to the magnetic recording disk by the first actuator and the second actuators,
    wherein the second actuators move simultaneously the support members respectively with respect to the support arm in respective directions opposite to each other.

2. A magnetic disk recording apparatus according to claim 1, wherein the first actuator moves the support members through the support arm by a relatively large length with respect to the magnetic recording disk, and the second actuator moves the support members by a relatively small length with respect to the magnetic recording disk.

3. A magnetic disk recording apparatus according to claim 1, wherein the magnetic disk recording apparatus comprises a pair of the magnetic heads, and each of the support members holds the magnetic head thereon as a combination of the magnetic head and the support member.

4. A magnetic disk recording apparatus according to claim 3, wherein the support members with the respective magnetic heads thereon are respectively swingable with respect to the support arm, and a moment of inertia of one of the combinations around the support arm is substantially equal to that of another of the combinations around the support arm.

5. A magnetic disk recording apparatus according to claim 3, wherein the support arm is swingable on an rotational axis of the first actuator, and a moment of inertia of one of the combinations around the rotational axis is substantially equal to that of another of the combinations around the rotational axis.

6. A magnetic disk recording apparatus according to claim 1, wherein one of the support members is prevented from holding the magnetic head thereon, and holds a counter weight.

7. A magnetic disk recording apparatus according to claim 6, wherein the support member with the magnetic head thereon and the support member with the counter weight thereon are respectively swingable with respect to the support arm, and a moment of inertia of a combination of the support member and the magnetic head around the support arm is substantially equal to that of a combination of the support member and the counter weight around the support arm.

8. A magnetic disk recording apparatus according to claim 6, wherein the support arm is swingable on an rotational axis of the first actuator, and a moment of inertia of a combination of the support member and the magnetic head on the rotational axis is substantially equal to that of a combination of the support member and the counter weight on the rotational axis.

9. A magnetic disk recording apparatus according to claim 1, wherein the second actuators move simultaneously the support members respectively with respect to the support arm in the respective directions opposite to each other by respective distances substantially equal to each other.

10. A magnetic disk recording apparatus according to claim 1, wherein the second actuators move simultaneously the support members respectively with respect to the support arm in the respective directions opposite to each other with respective forces substantially equal to each other.

11. A magnetic disk recording apparatus according to claim 1, wherein at least a part of the support arm and at least a part of each of the support members are monolithically formed, and a flexible area is arranged between the at least a part of the support arm and the at least a part of each of the support members.

12. A magnetic disk recording apparatus according to claim 1, wherein the second actuators are expandable and contractible to move respectively the support members with respect to the support arm, and the second actuators are energized in such a manner that one of the second actuators expands to move one of the support members in a first direction while another one of the second actuators contracts to move another one of the support members in a second direction, the first and second directions being opposite to each other.

13. A magnetic disk recording apparatus according to claim 12, wherein the second actuators are arranged in such a manner that directions parallel to a magnetic recording disk thickness direction in which directions the support members are simultaneously bent at least partially respectively by the expandable and contractible second actuators with respect to the support arm are identical to each other when the second actuators are energized to move respectively the support members with respect to the support arm.

14. A magnetic disk recording apparatus according to claim 13, further comprising a flexible member connecting the support arm to each of the support members, wherein the flexible member is juxtaposed with each of the second actuators in the magnetic recording disk thickness direction so that the support members are bent at least partially with respect to the support arm respectively in the directions parallel to the magnetic recording disk thickness direction by the second actuators.

15. A magnetic disk recording apparatus according to claim 12, wherein areas of the support members onto which the second actuators are fixed respectively face to each other in a magnetic recording disk thickness direction.

16. A magnetic disk recording apparatus according to claim 12, wherein the second actuators are piezoids.

17. A magnetic disk recording apparatus according to claim 16, wherein a polar direction of the piezoid of one of the second actuators is directed away from one of the support members moved by the one of the second actuators while a polar direction of the piezoid of another one of the second actuators is directed toward another one of the support members moved by the another one of the second actuators so that the one of the second actuators expands while another one of the second actuators contracts when the second actuators are energized.

18. A magnetic disk recording apparatus according to claim 16, wherein the piezoid of each of the second actuators has a pair of first electrode adjacent to the support arm and support members in a magnetic recording disk thickness direction and second electrode distant from the support arm and support members in the magnetic recording disk thickness direction, and electric potentials applied to the second electrodes respectively are equal to each other.

19. A magnetic disk recording apparatus according to claim 16, wherein an electric potential difference to be applied to the piezoid of one of the second actuators to be activated is equal to an electric potential difference to be applied to the piezoid of another one of the second actuators be activated.

20. A magnetic disk recording apparatus according to claim 16, wherein a change in electric potential difference to be applied to the piezoid of one of the second actuators to be activated in accordance with a time proceeding is substantially equal to an electric potential difference to be applied to the piezoid of another one of the second actuators to be activated in accordance with the time proceeding so that the movements of the support members in respective directions opposite to each other are synchronized.

21. A magnetic disk recording apparatus according to claim 1, wherein one of the second actuators has a first pair of expandable and contractible actuators to swing one of the support members around the support arm, another one of the second actuators has a second pair of expandable and contractible actuators to swing another one of the support members around the support arm, and the second actuators are energized in such a manner that one of the expandable and contractible actuators of the first pair expands while another one of the expandable and contractible actuators of the first pair contracts so that the one of the support members is swung in a first circumferential direction around the support arm, and one of the expandable and contractible actuators of the second pair expands while another one of the expandable and contractible actuators of the second pair contracts so that the another one of the support members is swung in a second circumferential direction around the support arm, the first and second circumferential directions being opposite to each other.

22. A magnetic disk recording apparatus according to claim 21, wherein the expandable and contractible actuators are arranged in such a manner that directions in which the support members are simultaneously twisted respectively by the first pair of the expandable and contractible actuators and the second pair of the expandable and contractible actuators with respect to the support arm are identical to each other when the second actuators are energized to swing respectively the support members with respect to the support arm.

23. A magnetic disk recording apparatus according to claim 22, further comprising a flexible member connecting the support arm to each of the support members, wherein the flexible member is juxtaposed with each of the second actuators in the magnetic recording disk thickness direction so that the support members are twisted respectively with respect to the support arm by the expandable and contractible actuators.

24. A magnetic disk recording apparatus according to claim 1, wherein the support members are electrically grounded.

25. A magnetic disk recording apparatus according to claim 1, wherein the support arm is electrically grounded.

* * * * *